(No Model.) 2 Sheets—Sheet 1.

F. J. STINCHCOMB.
CORN HARVESTER.

No. 460,836. Patented Oct. 6, 1891.

(No Model.) 2 Sheets—Sheet 2.

F. J. STINCHCOMB.
CORN HARVESTER.

No. 460,836. Patented Oct. 6, 1891.

Witnesses
Chas. J. Williamson
J. W. Walsh

Inventor
Frank J. Stinchcomb
By Alexander & Davis
Attys

UNITED STATES PATENT OFFICE.

FRANK J. STINCHCOMB, OF MORRIS, OHIO.

CORN-HARVESTER.

SPECIFICATION forming part of Letters Patent No. 460,836, dated October 6, 1891.

Application filed March 11, 1891. Serial No. 384,590. (No model.)

*To all whom it may concern:*

Be it known that I, FRANK J. STINCHCOMB, a citizen of the United States, residing at Morris, in the county of Seneca and State of Ohio, have invented certain new and useful Improvements in Corn-Harvesters, of which the following is a specification, reference being had therein to the accompanying drawings, in which—

Figure 1:
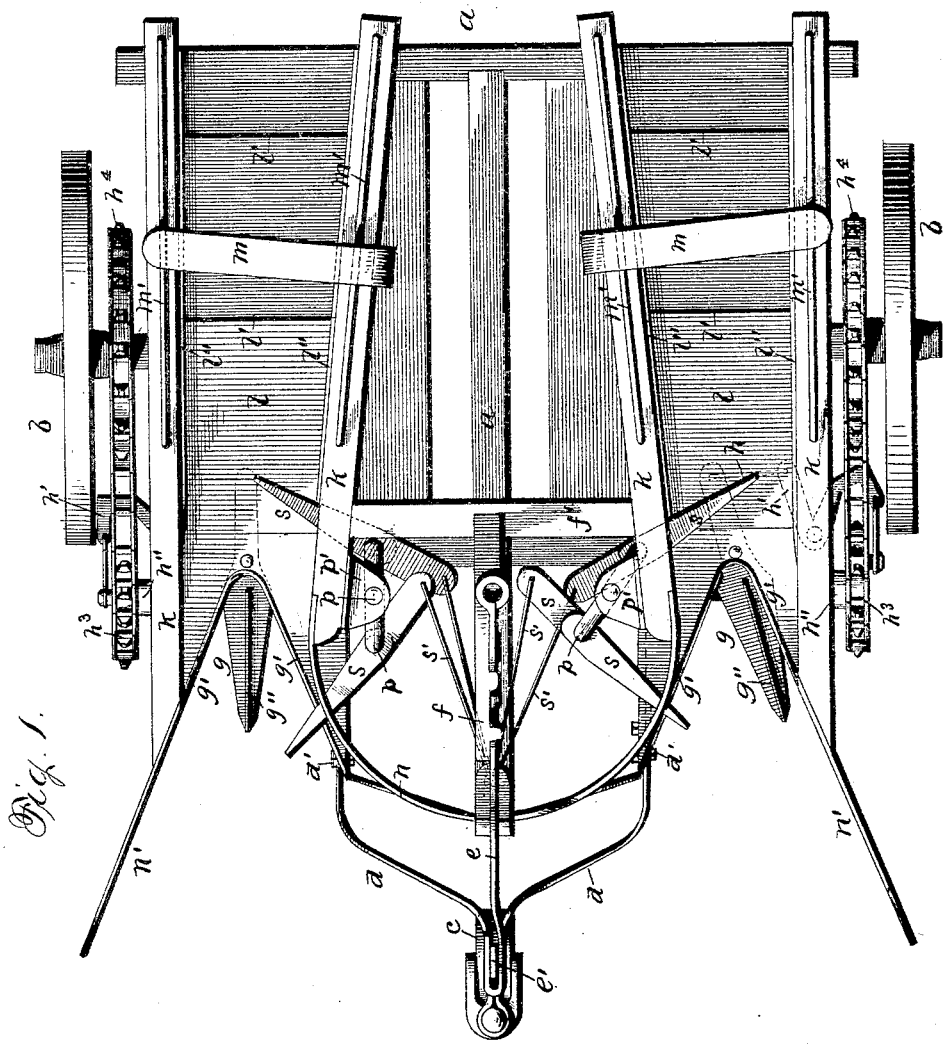
Figure 2:
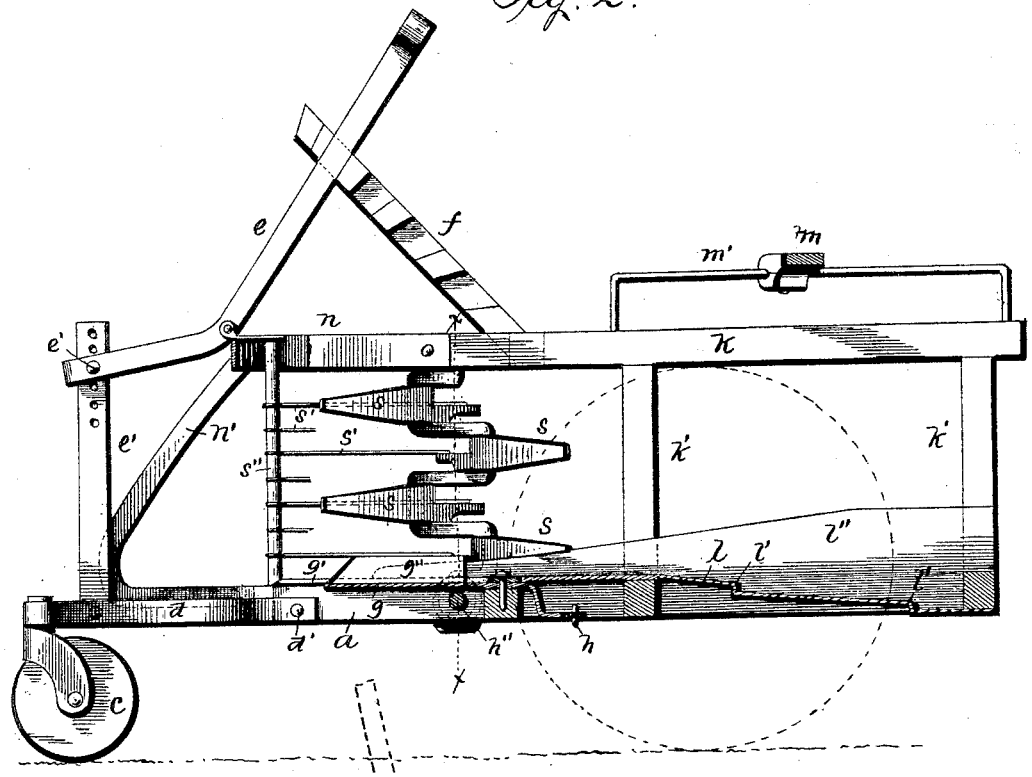
Figure 3:
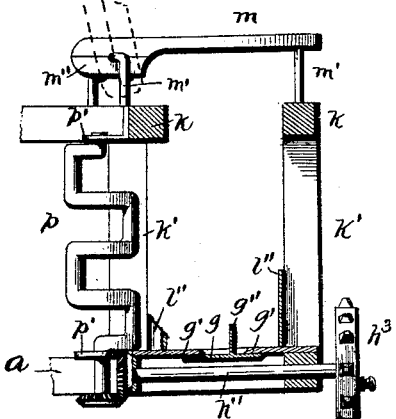

Figure 1 represents a plan view of my improved machine; Fig. 2, a vertical longitudinal sectional view thereof, taken through one of the knives and corn-receptacles; and Fig. 3, a detail vertical sectional view taken on the line $x\ x$ of Fig. 2.

This invention relates, particularly, to that class of corn-harvesters wherein the frame is mounted on transporting-wheels and provided with two sets of cutting apparatus and corn holding and supporting receptacles, whereby two rows of corn may be simultaneously cut and shocked or piled at intervals along the path of the machine; and it has certain important objects in view, which will be fully understood and appreciated from the following description, when taken in connection with the annexed drawings.

In the drawings, $a$ designates a suitable horizontal frame constructed of beams and mounted upon transporting-wheels $b$.

The forward end of the machine is supported by means of a centrally-arranged caster or steering-wheel $c$, which has its vertical pivot journaled in the forward pointed end of a yoke $d$, the arms of which are spread apart and pivotally connected at their extreme rear ends to the forward ends of two convenient longitudinal beams of the main frame. Upon the forward end of the yoke $d$ is erected a pivoted standard $e'$, adjustably connected to the upper end of which by means of a removable bolt $e''$ is the forward lower arm of an operating-lever $e$, fulcrumed upon a metal band $n$ on the forward end of the machine, the upper arm of this lever adjustably engaging a notched rigid beam $f$, projecting upwardly and forwardly from the front transverse beam $f'$ of the frame.

By means of the above arrangement of devices the front end of the machine may be raised and lowered, as the exigencies of the case may require, at the will of the driver, within easy reach of whom the operating-lever $e$ is located. It is essential that the standard $e'$ be pivoted on the yoke, in order that it may swing backwardly and forwardly as the same is raised and lowered in adjusting the cutting apparatus.

The cutting apparatus is located at the front side of the machine, and is combined with certain improved devices whereby when the machine advances the corn will be cut and loaded upon the same in an upright position.

The cutting apparatus consists of two double-edged pointed vibrating knives or cutters $g\ g$, one of which is located on either side of the machine, each cutter operating in conjunction with and vibrating between two forwardly-diverging stationary knives $g'$, carried by the frame, the vibrating cutters being respectively pivoted at the juncture of the stationary knives, so that the standing corn will be severed by a scissor-like cut when the cutters are vibrated and the machine advanced. The vibrating cutters are operated by means of suitable gearing driven by the power furnished by the traction of the machine in advancing, the preferred devices for thus operating the cutters consisting, as shown in Fig. 1, of angle-levers $h$, pivoted underneath the frame and having their arms connected by means of rods $h\ h$, respectively, to the rear extended ends of the said cutters and to the wrist-pins of suitable sprocket-wheels $h^3$, secured on horizontal transverse shafts $h''$, journaled in the frame of the machine under the cutters and driven by chain connections with large sprocket-wheels $h^4$, carried by the transporting-wheels, this mechanism serving to impart to the cutters a rapid vibrating movement as the machine moves forward over the ground. Each of the vibrating cutters is provided upon its upper side with a vertical longitudinal rib or fin $g''$, which extends from the forward pointed ends of the cutters to near their pivotal points, these ribs serving not only to materially strengthen the cutters, this matter of strengthening being an important desideratum in this class of machines because of the heavy strains to which the cutters are frequently subjected, but also to assist in pressing and holding the stalks against the cutting-edges of the stationary knives and preventing them sliding off and falling to the ground on the opposite side of the cutters when severed.

To receive the standing corn as it is severed by the cutters and pressed rearwardly by the mechanism hereinafter described are two receptacles or holders—one for each set of cutters—each of which is constructed of two horizontal beams $k k$, supported at a suitable distance from the frame by vertical posts $k'$, erected on the frame and diverging slightly rearwardly to facilitate the rearward movement of the loaded corn as the machine advances. The bottoms $l$ of these receptacles, which consist, preferably, of sheet metal, are inclined downwardly toward their rear ends and provided with transverse shoulders $l'$, which form abutments to prevent the loaded stalks slipping forward when the front end of the machine is lowered. To confine the lower ends of the loaded stalks, vertical side plates $l''$ are arranged along the inner sides of the receptacles.

To support the stalks in a vertical position as they are severed and forced into the receptacles each of said receptacles is provided with a friction-bar $m$, which automatically slides rearwardly upon the rods $m'$ as fast as the stalks are loaded, thereby rendering the capacity of the receptacles automatically variable. The stationary horizontal rods $m'$ are supported a short distance above and parallel with the beams $k$ and are connected thereto at their ends. The friction-bars $m$ are clamped at their inner ends to the inner rods by means of removable clamping-blocks $m''$, secured to the under sides of the bars by means of screws or bolts, these blocks enabling the clamping action upon the interposed rod to be varied to compensate for wear and create the required amount of friction. The free ends of the bars $m$ rest and travel upon the outer rods $m'$ while the machine is in operation, and when it is desired to unload the severed corn these bars may be easily swung back out of the way, as shown in dotted lines in Fig. 3.

It will be observed that as the corn is cut and forced into the receptacles the stalks remain in an upright position, they being supported by the side beams and the sliding bars, the latter bars being automatically moved backward by the pressure of the stalks as the same are forced backward by the vibrating arms hereinafter described. It will be observed that the friction-bars are unconnected with each other, and may therefore move rearwardly independently, which is advantageous, in that each bar is permitted to accommodate itself to the amount of stalks its receptacle receives. A semicircular forwardly-projecting band $n$ connects the forward ends of the inner beams $k$, this band serving to assist the forwardly-projecting lifting and guiding arms $n'$ in guiding the stalks properly to the cutters.

Vertical multiple crank-shafts $p$ are stepped in brackets $p'$, secured on suitable portions of the frame a little forward of the pivoted points and inside of the cutters, these vertical shafts receiving rotary motion through the medium of bevel gear-wheels secured on their lower ends and meshing with similar wheels secured on the inner ends of the horizontal shafts $h''$. Journaled on the crank-arms (of which there are preferably six) of these shafts are horizontal vibrating pushing-arms, the outer ends of which are adapted to be thrown by the crank-shafts out across or nearly across the path of the respective cutting apparatus and force the standing corn against the same and into the receptacles in the rear thereof. The inner ends of these arms are pivotally connected to a stationary vertical rod $s''$, mounted in the forward part of the frame by means of pivotal vibrating links or rods $s'$, these vibratory links serving to assist in giving the proper movement to the pushers when the crank-shaft is rotated, as is evident. These links or rods $s'$ extend rearwardly from the post $s''$ to the pushing-arm, and are therefore only subjected in operation to a pulling strain, whereby they are rendered more efficient in operation and are enabled to be made of small rod iron or wire, which would not be the case if they extended rearwardly from the arms and were subjected to a pushing or crushing strain.

While the foregoing details of construction constitute preferred devices for carrying out the principles of my invention, it is evident that changes and modifications may be made by a skilled mechanic without departing therefrom, and hence for the broader purpose of my invention I do not confine myself to the exact construction shown.

Should the sliding bars $m$ bind or bite on their supporting-rods by reason of their slight obliquity to the line of draft, it is evident that the driver may relieve the binding action and thereby assist their rearward movement by simply pressing lightly forwardly upon their free ends.

Having thus fully described my invention, what I claim as new, and desire to secure by Letters Patent, is—

1. A vibratory cutter for harvesters, consisting of a double-edged blade pointed at its forward end and provided upon its upper side with a central longitudinal rib or flange, substantially as described.

2. The combination, with a pair of forwardly-diverging knives, of a pointed double-edged vibratory cutter pivoted at the junction of the said diverging knives and provided with a longitudinal rib centrally along its upper side and means for operating the said cutter, substantially as described.

3. In a corn-harvester, the combination of a frame mounted on transporting-wheels and provided with cutting apparatus, a receptacle for the severed corn extending rearwardly from the cutting apparatus, a horizontal rod extending longitudinally of the receptacle, and a friction-bar traveling on said rod and extending across the receptacle and carrying means for variably clamping it to the said rod, substantially as and for the purpose described.

4. The combination of a frame mounted on transporting-wheels and provided with two sets of cutting apparatus, and a stalk-receptacle extending rearwardly from each of the said cutting apparatus and consisting of longitudinal beams and a transversely-shouldered bottom, a horizontal rod $m'$, secured on one of the upper longitudinal beams of each receptacle, and friction-bars $m$, mounted on the rods $m'$ and each extending across its respective receptacle, the said friction-bars being adapted to slide rearwardly automatically and independently of each other, as and for the purpose described.

5. The combination of a frame, a cutting apparatus, an open-ended receptacle for the standing corn, constructed of longitudinal beams and a bottom, a stationary rod supported in one of the said longitudinal beams and extending approximately its full length, and a sliding friction-bar pivotally clamped on said rod and extending across the receptacle, as and for the purpose described.

In testimony whereof I affix my signature in presence of two witnesses.

FRANK J. STINCHCOMB.

Witnesses:
E. M. HAINES,
N. D. EGBERT, Jr.